(12) United States Patent
Zhu et al.

(10) Patent No.: US 8,185,476 B2
(45) Date of Patent: May 22, 2012

(54) DIGITAL RIGHTS MANAGEMENT SYSTEM PROTECTING CONSUMER PRIVACY

(75) Inventors: Bin Benjamin Zhu, Edina, MN (US); Min Feng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 717 days.

(21) Appl. No.: 11/970,161

(22) Filed: Jan. 7, 2008

(65) Prior Publication Data
US 2009/0175442 A1 Jul. 9, 2009

(51) Int. Cl.
*G06F 21/00* (2006.01)
(52) U.S. Cl. .............. 705/59; 705/50; 705/51; 705/901; 705/902; 705/904; 705/908
(58) Field of Classification Search ...................... 705/59
See application file for complete search history.

(56) References Cited

U.S. PATENT DOCUMENTS

| | | | | |
|---|---|---|---|---|
| 4,759,063 | A * | 7/1988 | Chaum | 380/30 |
| 4,759,064 | A * | 7/1988 | Chaum | 380/30 |
| 4,914,698 | A * | 4/1990 | Chaum | 380/30 |
| 4,949,380 | A * | 8/1990 | Chaum | 380/30 |
| 4,991,210 | A * | 2/1991 | Chaum | 380/30 |
| 4,996,711 | A * | 2/1991 | Chaum | 380/30 |
| 5,224,162 | A * | 6/1993 | Okamoto et al. | 705/69 |
| 6,484,182 | B1 * | 11/2002 | Dunphy et al. | 705/26 |
| 7,587,502 | B2 * | 9/2009 | Crawford et al. | 709/229 |
| 7,594,275 | B2 | 9/2009 | Zhu et al. | |
| 7,707,114 | B2 * | 4/2010 | Tuoriniemi | 705/57 |
| 7,711,586 | B2 * | 5/2010 | Aggarwal et al. | 705/5 |
| 2001/0025272 | A1 * | 9/2001 | Mori et al. | 705/76 |
| 2002/0023143 | A1 * | 2/2002 | Stephenson et al. | 709/218 |
| 2004/0039916 | A1 * | 2/2004 | Aldis et al. | 713/177 |
| 2008/0209575 | A1 * | 8/2008 | Conrado et al. | 726/29 |

OTHER PUBLICATIONS

XL C/C++ V8.0 for AIX, IBM, Apr. 14, 2006, retrieved from http://publib.boulder.ibm.com/infocenter/comphelp/v8v101/index.jsp on May 26, 2010.*
Fehily, Chris. SQL, Peachpit Press, Berkeley, CA, 2002.*
Schneier, Bruce. Applied Cryptography, second ed. John Wiley & Sons, Inc. New York, 1996.*
Bellare, et al., "The Power of RSA Inversion Oracles and the Security of Chaum's RSA-Based Blind Signature Scheme", Financial Cryptography'01, LNCS, Springer-Verlag, 2001, Date: Jan. 5, 2001, pp. 1-19.
Chaum, D., "Blind Signatures for Untraceable Payments", Advances in Cryptology—Crypto 82, Date: 1983, pp. 199-203.
Zhang, et al., "Efficient Verifiably Encrypted Signature and Partially Blind Signature from Bilinear Pairings", Indocrypt'03, LNCS, Springer-Verlag, 2003, Date: 2004, pp. 1-14.
"Microsoft Windows Media Digital Rights Management"; http://www.microsoft.com/windows/windowsmedia/forpros/drm/default.mspx; Mar. 23, 2006.
U.S. Appl. No. 10/685,234, including all Office Actions and Responses, and 1.132 Affidavit filed Nov. 6, 2007.
Wang, Y. et al.; "Exploring Traversal Strategy for Web Forum Crawling"; Proc. of SIGIR 2008; Singapore, Jul. 2008, pp. 459-468.

* cited by examiner

*Primary Examiner* — Andrew J. Fischer
*Assistant Examiner* — Joshua Murdough

(57) ABSTRACT

Technologies for a Consumer Privacy Digital Rights Management system based on stable partially blind signatures that enable a license server to provide licenses for delivery to users without knowing the corresponding digital contents that users access with the license. Therefore consumer privacy is protected during license acquisition. Further, if the client DRM module in the DRM system does not disclose any information about a user's digital content access, and the messages that the client DRM module sends out are in plain text enabling verification that the client DRM module is not disclosing such information, then consumer privacy is fully protected by the DRM system.

19 Claims, 6 Drawing Sheets

DIGITAL RIGHTS MANAGEMENT SYSTEM PROTECTING CONSUMER PRIVACY

BACKGROUND

The use of digital content has increased significantly due to its high quality and efficiency in storage and distribution. Protection against piracy is needed and so Digital Rights Management ("DRM") technologies are employed to provide persistent rights management for digital contents. In a typical DRM system, content is encrypted and packaged for distribution. A rights object, also called a license, must generally be obtained by a user to access the protected content. A license typically contains the decryption key as well as a specification of rights that a user has acquired. Licenses may be distributed and stored separately from the corresponding contents to make it easier to manage the entire system. A license is typically acquired from a license server. It is usually locked to a user or a user's computer to prevent unauthorized sharing with other people or computers. A DRM system typically enforces the acquired rights through trusted DRM modules on the client side.

The technologies employed by a DRM system to enforce intellectual property protection may sacrifice consumer privacy. For example, the DRM client module knows what content a user accesses, and the license server knows what contents a user has acquired licenses for. The latter case can be explained as follows. In a typical DRM system, a license and the decryption key are associated with a protected content through a key identifier ("ID") or the like. A key ID may be used instead of a content ID since it enables a content to be packaged into multiple different packages by encrypting it with different encryption keys. When a user acquires a license from a license server, the key ID is typically retrieved from the protected content and sent to the license server which typically generates or retrieves the corresponding content decryption key and sends it to the user in a license. More precisely, the decryption key in the license may be encrypted by the public key bound to the user's device so that only the targeted device can access the protected content. By searching a database or protected content objects, it may not be difficult to identify the content associated with the key ID. As a result, the submitted key ID enables a license server or the like to link a user with the contents associated with the licenses acquired from the license server. This may represent an intrusion into consumer privacy. A balance is desirable between protection of intellectual property for content owners and protection of privacy for consumers. A question naturally arises: is it possible to let a license server send a user the correct decryption key without knowing the key ID, content ID, specific content, or the like? This seems to be a hard problem for a DRM system in which, for the sake of security, each content object is encrypted with a unique encryption key. Without knowing the key ID, a license server does not typically know which decryption key a consumer needs to access the content.

SUMMARY

The following presents a simplified summary of the disclosure in order to provide a basic understanding to the reader. This summary is not an extensive overview of the disclosure and may not identify key/critical elements of the invention or delineate the scope of the invention. Its sole purpose is to present some concepts disclosed herein in a simplified form as a prelude to the more detailed description that is presented later.

The present examples provide for a Consumer Privacy Digital Rights Management system based on stable blind or partially blind signatures that enable a license server to provide licenses for delivery to users without knowing the corresponding digital contents that users access with the license. Therefore consumer privacy is protected during license acquisition. Further, if the client DRM module in the DRM system does not disclose any information about a user's digital content access, and the messages that the client DRM module sends out are in plain text enabling verification that the client DRM module is not disclosing such information, then consumer privacy is fully protected by the DRM system. The term "stable partially blind signature" as used herein may alternatively refer to a "stable blind signature".

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing and networking environment, the environment described is provided as an example and not a limitation. As those skilled in the art will appreciate, the present examples are suitable for application in a variety of different types of computing and networking environments.

Figure 1:
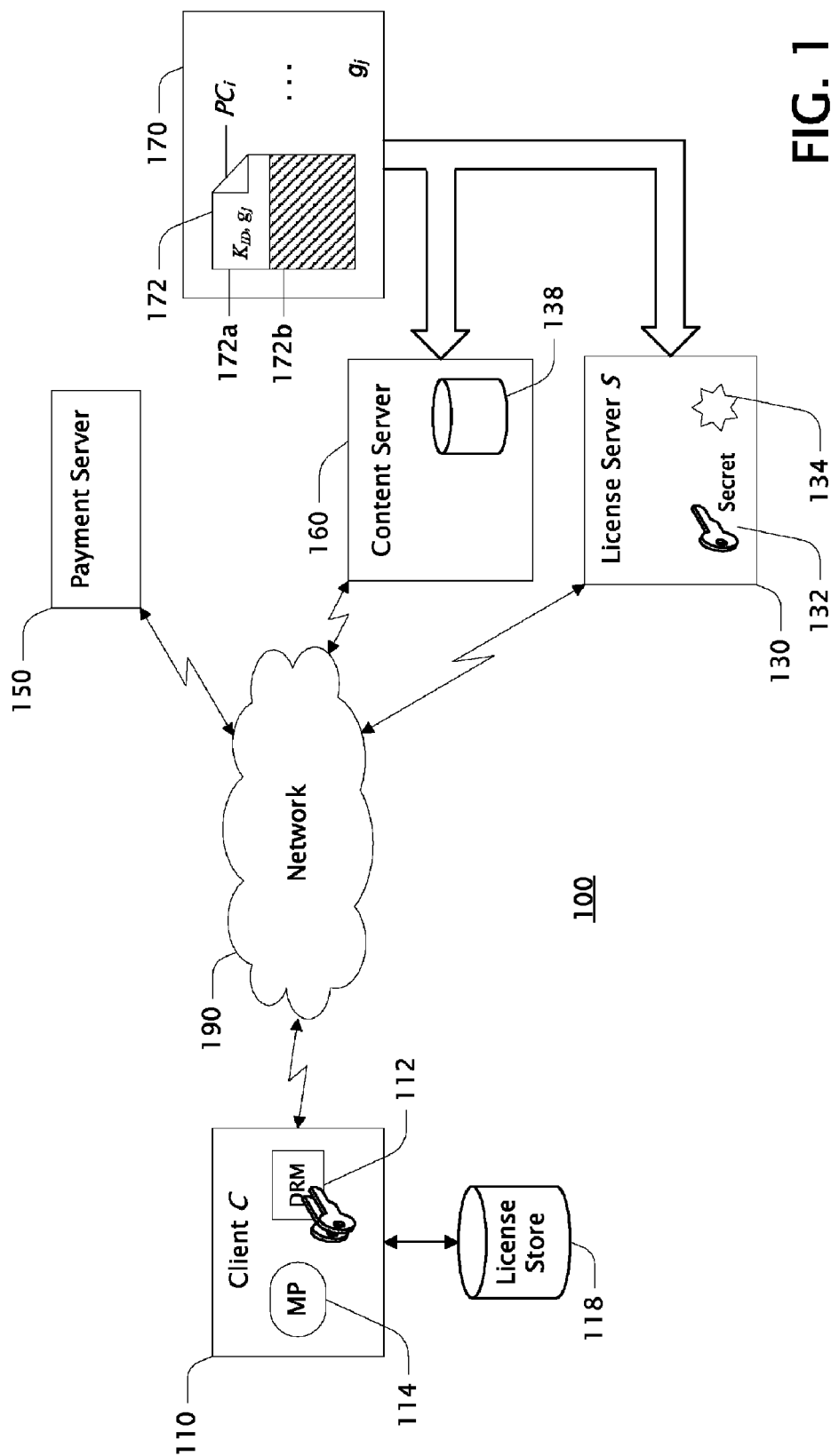
FIG. 1 is a block diagram showing an example Consumer Privacy Digital Rights Management system operable to protect both digital content and consumer privacy.

FIG. 1 is a block diagram showing an example Consumer Privacy Digital Rights Management ("CPDRM") system 100 operable to protect both digital content and consumer privacy.

CPDRM 100 enables a client, such as client C 110 and associated license store 118, to obtain a license for access to digital content so as to protect the digital content from unauthorized use, and so as to prevent license server S 130 and other servers of CPDRM system 100 from learning which digital content the client is accessing, thus protecting consumer privacy.

CPDRM 100 typically includes client DRM module 112 on client C 110 communicating via network 190 with license server S 130 and typically with content server 160 and payment server 150. The term "digital content", as used herein, typically refers to any conventional audio, video, image, and/or the like represented in a digital form. Such digital content may be encrypted for protection and may require a license which typically including a decryption key to access the digital content. Such a license may also include "rights" to the digital content, i.e., the right to play the content or modify the content. A DRM system typically uses such a license and rights to determine if an action requested by a user with respect to the corresponding digital content can be rightfully performed and, if so, to access the digital content accordingly. Digital content may also be referred to herein as protected content, packaged content, a package, a content object, media content, and the like.

Client C 110 typically represents a user device such as a personal computer ("PC"), personal data assistant ("PDA"), cell phone, music player, video player, DVD player, or the like, or any other suitable client including those described in connection with FIG. 6. Client C 110 may be capable of obtaining digital content over a network, such as network 190, which may represent the Internet, a corporate network or the like, a wireless network, or any other type of communications medium capable of making digital content available to client C 110.

Client C 110 typically includes client DRM module 112 which may include a conventional public-private key pair of client C 110. Client DRM module 112 typically interacts with license store 118 to retrieve and store licenses and the like related for various digital contents. Client C 110 may also include, for example, media player 114 or the like capable of using a license to access digital content. Client C 110 may be coupled to network 190 or the like to communicate with license server S 130, payment server 150, content server 160, and/or other systems or services including sources of digital content such as digital content for which license server S 130 may provide licenses. In general, client DRM module 112 (and thus client C 110) supports the License Acquisition Protocol ("LAP") described herein below.

Even when using the LAP, client DRM module 112 may still collect a consumer's digital content access information and communicate it to other entities, such as license server S 130. To address this issue, client DRM module 112 of CPDRM system 100 is required to not send out, and to not enable the sending out of, any information about a consumer's digital content access. Further, all communications sent from client DRM module 112 are required to be in plain text for easy verification that no unauthorized information is being sent. Encryption at a later stage, such as Secure Sockets Layer ("SSL") applied at the transport layer is allowed so long as it does not affect a user's ability to inspect messages sent by the client's DRM module.

In general, license server S 130 represents a server, service, system, web service, or the like operable to accept a license request from client C 110, and to return a corresponding license to client C 110. License server S 130 typically includes a secret key 132 known only to license server S 130. Secret key 132 is typically used in conjunction with stable partially blind signature algorithm ("SPBSA") 134 in support of the License Acquisition Protocol ("LAP") as described herein below. Further, license server S 130 typically supports the License Acquisition Protocol ("LAP") described herein below. While SPBSA 134 is shown in FIG. 1 as associated with license server S 130, it is typically performed by the combination of client C 110 and license server S 130.

In general, content server 160 represents a server, service, system, web service, or the like operable to maintain and store digital contents, and/or information regarding the digital contents, appropriately packaged and grouped for use in CPDRM system 100. Data store 138 may provide for such storage and may be part of content server 160 or separate from content server 160. Content server 160 is typically operable to accommodate a request for content downloading and/or streaming or the like from clients such as client C 110.

In general, payment server 150 represents a server, service, system, web service, or the like operable to accept a conventional form of payment or the like from client C 110 for access rights to digital content, and to return a payment token to client C 110 including a description of the acquired rights, the license and rights corresponding to the paid-for digital content. Further, payment server 150 typically supports the License Acquisition Protocol ("LAP") described herein below.

CPDRM system 100 typically maintains digital contents in groups, such as example group $g_j$ 170. CPDRM system 100 may include m groups of digital contents, or any number of groups. Each group typically includes a large number of digital contents, each digital content appropriately packaged for use in CPDRM system 100 as described herein below. For example, group $g_j$ 170 is shown with n digital contents including example digital content $PC_i$ 172. Each appropriately packaged digital content typically includes an unencrypted header 172a including a key identifier ("$K_{ID}$") and a group identifier ("g"), and an encrypted portion 172b generally containing the digital content itself (e.g., audio, video, and/or the like) in encrypted form. In general, $K_{ID}$ uniquely represents a decryption key k for the corresponding digital content. In the case of example packaged content 172, the group identifier $g_j$ identifies example group j 170 of which digital content 172 is a member.

In one example, the digital contents are organized into groups according to price with all the digital contents in the same group having the same price. Ideally, there are a large number of digital contents in any given group so as to make it difficult to know which digital content is being licensed by a client when only provided with the group identifier and not the digital content's identifier. Other grouping scheme (other than price-based) may alternatively or additionally be employed. The packaged and grouped digital content, and/or information describing such, may be maintained and stored by content server 160 in one or more data stores such as data store 138 or the like.

Stable partially blind signature algorithm ("SPBSA") 134 may be based at least in part on conventional blind or partially blind signatures. In a blind signature scheme, a requester (such as client C 110) typically uses a random number to blind a message to be signed, and then submits the blinded message to a signer to sign. Since the blinded message that the signer signs cannot be differentiated from an arbitrary message, the signer cannot interpret the message being signed. The requester, knowing the random number, can un-blind the signature (signed message) received from back the signer to obtain a valid signature for the original message.

Unlike blind signatures in which the signer knows nothing about the message being signed, partially blind signatures allow the requester to explicitly include some agreed upon plain text information with the blinded message and/or the signer to explicitly include some agreed upon plain text information in the blind signature being returned to the requester. Such partial knowledge of the message sent to a signer enables a requester to send specific explicit information together with the blinded information for the signer to use in signing. When the agreed-upon clear text information is empty, a partially blind signature may be regarded as a blind signature.

Partially blind signatures may be classified into two types: stable partially blind signatures and unstable partially blind signatures. In one example of a stable partially blind signature there is only one valid signature possible for each original message given a particular group identifier. In one example of an unstable partially blind signature multiple valid signatures are possible for a given message and group identifier. Because stable partially blind signatures are deterministic, that is there exists one and only one signature for a given message and group identifier, a stable partially blind signature algorithm is typically used by CPDRM system 100.

Figure 2:
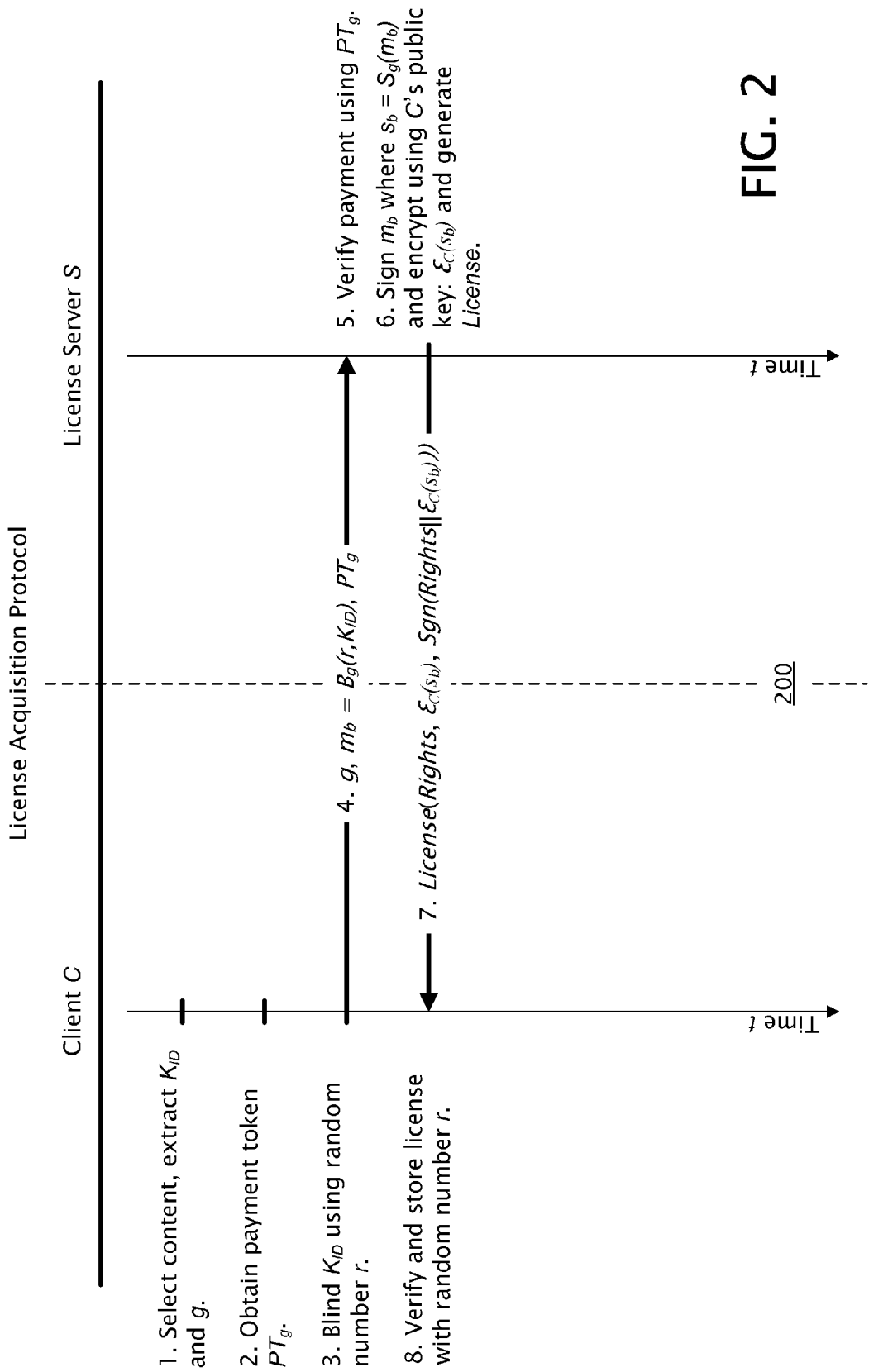
FIG. 2 is a diagram showing an example License Acquisition Protocol that may be used by the Consumer Privacy Digital Rights Management system.

FIG. 2 is a diagram showing an example License Acquisition Protocol ("LAP") 200 that may be used by CPDRM system 100. The following symbols are used herein in describing the operation of LAP 200:

C Consumer or client, such as client C 110 of FIG. 1.
S License server, such as license server S 130 of FIG. 1.
$K_{ID}$ Key identifier, a unique identifier corresponding to a particular digital content encryption and its decryption key.
m Message to be signed.
g Group identifier, such as of the group to which a digital content belongs.
$PT_g$ Payment token, a proof of payment for a digital content belonging to group g typically including a description of acquired rights.
r Random number, used for blinding a message m.
$B_g(r, m)$ Blinding function, blinds message m using random number r for digital content of group g.
$S_g(.)$ Stable partially blind signature algorithm, the resulting signature corresponding to digital content of group g, such as SPBSA 134 of FIG. 1.
$B_g^{-1}(r, S_g(.))$ Un-blinding function, un-blinds the signature for digital content of group g where the previously applied blinding function used random number r.
Sgn(m) Signature of message m, or the signed message m.
$Sgn_g(m)$ Signature of message m using $S_g(.)$ with a group identifier parameter g.
□c Public key encryption using C's public key.
$D_c$ Public key decryption using C's private key.
k Digital content encryption/decryption key corresponding to $K_{ID}$.

FIG. 2 includes corresponding time-lines t for client C and license server S, such as client C 110 and license server S 130 of FIG. 1. The basic steps for LAP 100 are shown on the time-lines and are explained in detail herein below.

Step 1 typically indicates client C selecting some digital content for access. For example, a consumer browses a music site using client C and selects a particular song which is made available in the form of digital content and which corresponds to a license available from license server S. The digital content is typically packaged as described for example $PC_i$ 172 of FIG. 1. Client C extracts the key identifier $K_{ID}$ and the group identifier g from the plain-text header (such as example header 172a of FIG. 1) of the selected digital content. In this example, the selected digital content may be stored and accessed locally on client C, or may be downloaded or streamed or the like from content server 160 to client C directly or from some other location pointed to by content server 160. Once a digital content is selected and $K_{ID}$ and g are extracted, LAP 200 typically continues at step 2.

Step 2 typically indicates client C submitting a conventional form of payment or the like to a payment service or the like, such as example payment server 150 of FIG. 1, for the selected content in group g. The payment typically includes the group identifier g of the selected content but does not disclose the selected content itself. Further, the payment typically includes a description of the desired rights for the selected content, such as play, modify, and/or other conventional rights. In response to successful payment by client C, the payment server typically returns payment token $PT_g$ to client C which indicates payment for any digital content in group g and generally includes a description of the acquired rights to the digital content. In general, nothing associated with the payment, the payment token, the rights, and/or the payment process identifies the selected digital content and/or its $K_{ID}$ or the like. Thus it is desirable to have a large number of digital contents in a group to help protect consumer privacy; specifically to prevent the disclosure of the identity of the selected digital content to the license server S, the payment server, the content server, or any other server or the like beyond client C itself and any associated license stores or the like. Once a payment token is obtained, LAP 200 typically continues at step 3.

Step 3 typically indicates client C blinding the $K_{ID}$ extracted from the selected content using a random number r where $m_b = B_g(r, K_{ID})$ where $m_b$ is the resulting blinded message, the blinded $K_{ID}$. The random number r is typically preserved for later un-blinding and storage with the corresponding license obtained from license server S. Once the extracted $K_{ID}$ is blinded, forming message $m_b$, then LAP 200 typically continues at step 4.

Step 4 typically indicates client C sending group identifier g of the selected digital content, blinded message $m_b$, and payment token $PT_g$ to license server S. In general, assuming a large number of digital contents in group g, no information identifying or enabling the identification of the selected digital content and/or its $K_{ID}$ is sent by client C to license server S. Once g, $m_b$, and $PT_g$ have been sent to license server S, the LAP 200 typically continues at step 5.

Step 5 typically indicates license server S verifying payment based on payment token $PT_g$. If verification fails, license server S refuses to provide a license to client C. Once the payment is verified, LAP 200 typically continues at step 6.

Step 6 typically includes license server S signing $m_b$ using a stable partially blind signature algorithm: $s_b = S_g(m_b)$, where g is the group identifier, and then encrypting the resulting signed blinded message $s_b$ with client C's public key: $□_c(s_b)$. In this example, $s_b$ is encrypted by client C's public key so that only client C can decrypt and retrieve $s_b$ even if the corresponding license generated by license server S and/or the random number r are shared with other people or clients. Further, license server S generates a license including $□_c(s_b)$, the acquired rights Rights, and the signature Sgn(Rights∥$□_c(s_b)$), where the license may be expressed as License(Rights, $□_c(s_b)$, Sgn(Rights∥$□_c(s_b)$)). Once the blinded message is signed and encrypted by license server S and the corresponding license License is generated, LAP 200 typically continues at step 7.

Step 7 typically indicates license server S sending the license License(Rights, $□_c(s_b)$, Sgn(Rights∥$□_c(s_b)$)) to client C. Once the license is sent to client C, LAP 200 typically continues at step 8.

Step 8 typically indicates client C verifying the integrity and authenticity of the license received from license server S by checking Rights and $\square_c(s_b)$ against signature Sgn (Rights$\|_c(s_b)$). If the verification succeeds, client C stores License along with the corresponding random number r in a license store or the like, such as license store 118 of FIG. 1, such that the license and corresponding r can be retrieved using the corresponding $K_{ID}$. After the license has been verified and stored, along with the corresponding random number r, LAP 200 is typically complete.

Once $\square_c(s_b)$ is known to client C, such as from the verified license, the digital content decryption key k can be calculated. The encrypted signed blinded message $\square_c(s_b)$ can be decrypted using client C's private key resulting in $s_b=D_c(\square_c(s_b))$. Client C then uses the corresponding random number r to un-blind $s_b$ to get $Sgn_g(K_{ID})=B_g^{-1}(r, s_b)$. Since the $S_g(.)$ used to sign the blinded message $m_b$ is a stable partially blind signature algorithm, the stable signature resulting from un-blinding $s_b$ is the encryption key $k=Sgn_g(K_{ID})$ used to encrypt the digital content during packaging, as described herein below. This same key k is used to decrypt the digital content since the decryption key is typically the same as the encryption key. At this point client C can access the digital content using key k without the specific digital content having been identified outside of client C.

Figure 3:
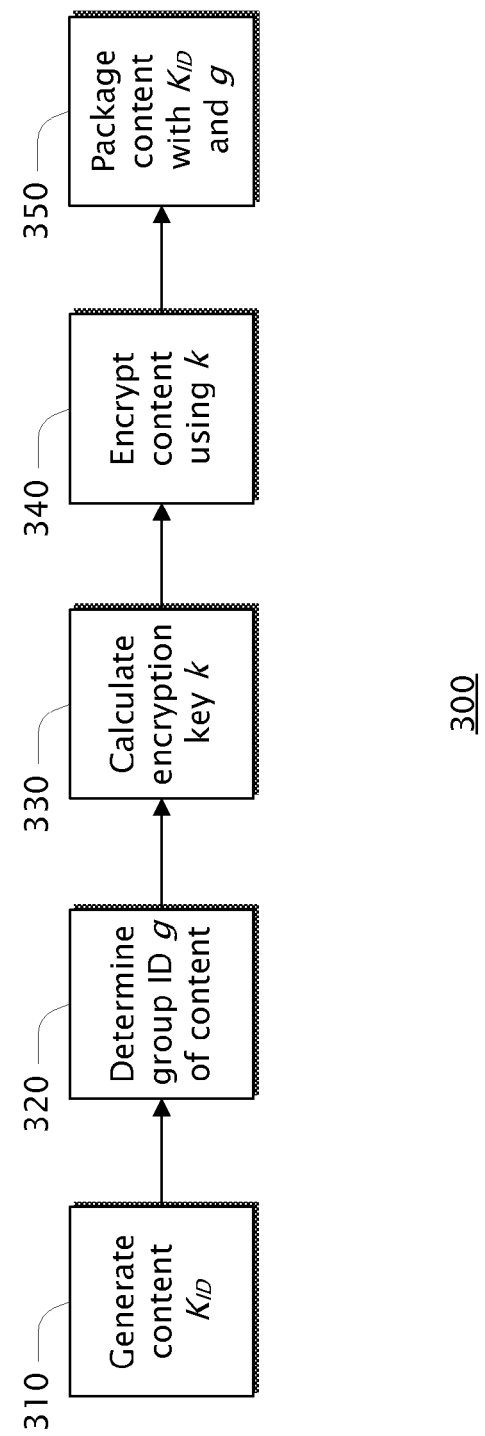
FIG. 3 is a block diagram showing an example method for packaging digital content for use with a Consumer Privacy Digital Rights Management system.

FIG. 3 is a block diagram showing an example method 300 for packaging digital content for use with a Consumer Privacy DRM system, such as example CPDRM system 100 of FIG. 1. In one example, packaging is performed by a packaging server or the like in communication with a licensing server, such as licensing server S 130 of FIG. 1, and a content server, such as content server 160 of FIG. 1. In other examples, packaging, licensing, content providing, and/or payment servicing may be performed by the same server, service, system, web service, or the like, or by any number or combination of such. Method 300 typically results in packaged digital content organized into groups, such as digital content $PC_j$ 172 in group $g_j$ 170 as described in connection with FIG. 1. Each such packaged digital content typically includes the encrypted digital content itself (e.g., audio, video, and/or the like) as well as a plain text header including a corresponding key identifier $K_{ID}$ uniquely identifying a key k used to encrypt the encrypted portion of the digital content, and group identifier g identifying the group of which the digital content is a member. In one example, method 300 is performed by a packaging server or the like. In alternative examples, method 300 may be performed by any server, service, system, web service, or the like, including a license server such as license server S 130 of FIG. 1.

Block 310 typically indicates generating a unique key identifier $K_{ID}$ for the digital content. In one example, this is accomplished by generating a number that is unique from any key identifiers of any other digital content of the CPDRM system. In one example, a $K_{ID}$ is simply a unique number. In another example, a $K_{ID}$ is a global unique identifier ("GUID"). Once a $K_{ID}$ has been generated, then method 300 typically continues at block 320.

Block 320 typically indicates determining the group, and thus the group ID g, to which the digital content belongs. In general, group identifiers are unique one from another. In one example, digital contents are organized into groups based on price; i.e., digital contents of the same price belong to the same group. Other grouping schemes may alternatively or additionally be used. Ideally there are a large number of digital contents in any one group. Once the group identifier g for the digital content has been determined, method 300 typically continues at block 330.

Block 330 typically indicates calculating an encryption key k for the digital content based on its corresponding key identifier $K_{ID}$ and group identifier g. In one example, the values of $K_{ID}$ and g are sent to a license server or the like, such as license server S 130 of FIG. 1, which calculates an encryption key k by signing $K_{ID}$ using a stable partially blind signature algorithm, such as SPBSA 134 of FIG. 1, and a secret known only to the license server, such as secret key 132 of FIG. 1, such that $k=Sgn_g(K_{ID})$ where $K_{ID}$ and g are among the sent values. Once encryption key k is calculated, method 300 typically continues at block 340.

Block 340 typically indicates encrypting the digital content using encryption key k. In one example, symmetric encryption is used to encrypt the digital content during packaging. Therefore, the encryption key k is also the decryption key. As can be seen in the description of block 330, a digital content's encryption key k is related to its $K_{ID}$ by the following equation: $k=Sgn_g(K_{ID})$, where g is the group identifier of the group to which the digital content belongs. The signature $Sgn_g(K_{ID})$ generated by a stable partially blind signature algorithm such as $S_g(.)$ is typically a deterministic mapping between $K_{ID}$ and g. The result does not depend on the random number r used to blind $K_{ID}$ during license acquisition (described in connection with FIG. 2). This implies that the same key k can be regenerated once g and the unencrypted, signed, un-blinded $K_{ID}$ are obtained by client C. This property is used to generate the decryption key k without the license server or the like having knowledge of the $K_{ID}$ of the selected digital content, thus protecting consumer privacy. One the digital content is encrypted, method 300 typically continues at block 350.

Block 350 typically indicates packaging the encrypted digital content to include a plain text header with $K_{ID}$ and g. Once the digital content is so packaged, method 300 is typically complete. At this point, the digital content can be freely distributed using any desirable means. For example, the digital content can be uploaded to content server 160 of FIG. 1, from which it may then be streamed or downloaded by a client. But such digital content can typically only be accessed by first obtaining a corresponding license such as that described in step 8 in connection with FIG. 2.

Figure 4:
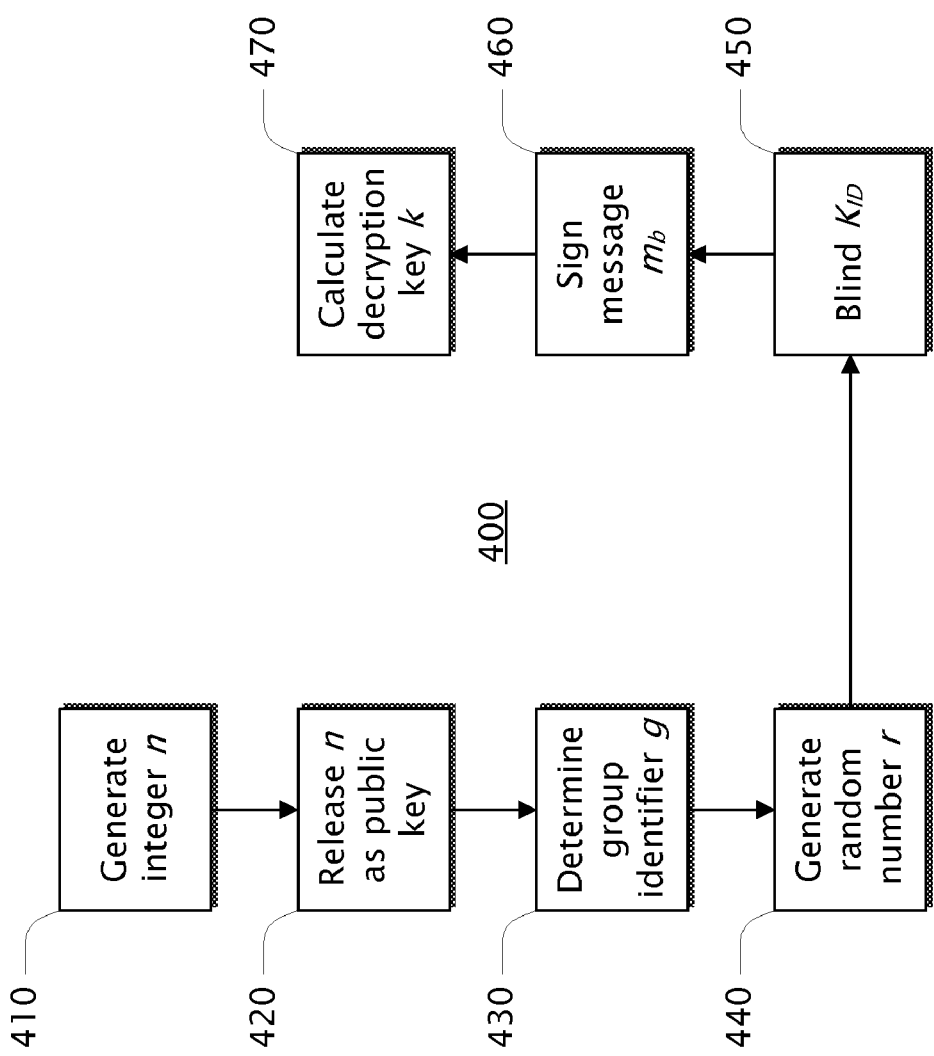
FIG. 4 is a block diagram showing an example method of an example variation of the License Acquisition Protocol based on a Rivest, Shamir, and Adleman blind signature algorithm.

FIG. 4 is a block diagram showing an example method 400 of an example variation of the License Acquisition Protocol (described in connection with FIG. 2) based on a Rivest, Shamir, and Adleman ("RSA") blind signature algorithm ("RSABSA"). The description of this variation herein below refers to the selected digital content, other elements, and the steps described in connection with FIG. 2.

Block 410 typically indicates a license server or the like, such as license server S 130 of FIG. 1, generating an integer n=pq where p and q are large prime numbers. This step is generally performed prior to the steps of FIG. 2. Once integer n is generated, method 400 typically continues at block 420.

Block 420 typically indicates releasing integer n as a public key. This step is generally performed prior to the steps of FIG. 2. Once integer n is released as a public key, method 400 typically continues at block 430.

Block 430 typically indicates determining a group identifier g for the group to which the selected content belongs. First, let $\phi(n)=(p-1)(q-1)$. Then, group identifier g is determined such that g belongs to a set of prime numbers co-prime with $\phi(n)$. This step is generally performed prior to the steps of FIG. 2. Once the group identifier g has been determined for the selected digital content and packaged with it, method 400 typically continues at block 440.

Block 440 typically indicates client C generating a random number r, where 1<r<n−1, and computes R=r$^g$ mod n. Once the random number r is generated, method 400 typically continues at block 450.

Block 450 typically indicates client C blinding $K_{ID}$ by computing $m_b = K_{ID} \cdot R$ mod n, and then sending the values g, $m_b$, and $PT_g$ to the license server as indicated in step 4 of FIG. 2. Once $K_{ID}$ is blinded and the values are sent, method 400 typically continues at block 460.

Block 460 typically indicates license server S computing $g^{-1}$ mod $\phi(n)$ and then $s_b = m_b{}^{g^{-1}mod\phi(n)}$ mod n after performing step 5 described in connection with FIG. 2. The license server S then typically sends a license (including $s_b$ as computed at block 460) to client C, as indicated in step 7 of FIG. 2. Once complete, then method 400 typically continues at block 470.

Block 470 typically indicates client C calculating decryption key k based on the license received from license server S and after performing step 8 described in connection with FIG. 2. In one example, client C uses its private key to decrypt $\square_c(s_b)$ to obtain $s_b = m_b{}^{g^{-1}mod\phi(n)}$ mod n. It then uses the random number r to calculate the digital content decryption key $k = m_b{}^{g^{-1}}/r = K_{ID}{}^{g^{-1}}$ mod n. At this point, decryption key k can be used to access the selected digital content, and method 400 is typically complete.

Figure 5:
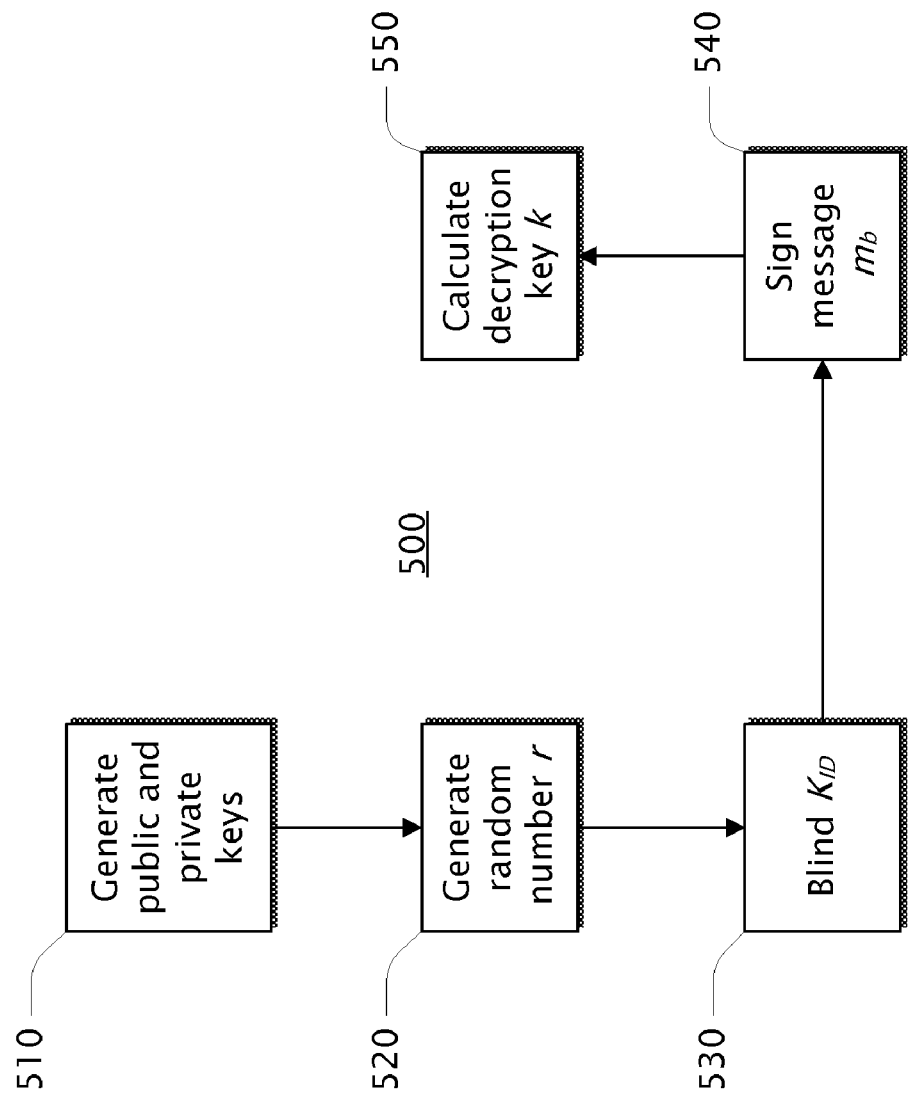
FIG. 5 is a block diagram showing an example method of another example variation of the License Acquisition Protocol based on a Bilinear Pairing blind signature algorithm.

FIG. 5 is a block diagram showing an example method 500 of another example variation of the License Acquisition Protocol (described in connection with FIG. 2) based on a Bilinear Pairing blind signature algorithm ("BPBSA"). The description of this variation herein below refers to the selected digital content, other elements, and the steps described in connection with FIG. 2.

Bilinear pairings may be used in constructing cryptographic primitives. In this example, let $G_1$ and $G_2$ be two cyclic groups of the same order q. Let $e: G_1 \times G_1 \to G_2$ be a bilinear pairing with the following properties:

Bilinearity: $e(aU, bV) = e(U,V)^{ab}$ for all $U, V \in G_1, a, b \in Z_q$.
Non-degeneracy: There exists $U, V \in G_1$ such that $e(U, V) \neq 1$.
Computability: There is an efficient algorithm to compute $e(U, V)$.

Security of bilinear pairings-based cryptographic primitives is typically built on well-known hard problems of pairing. These hard problems may include Discrete Logarithm Problem ("DLP") and the Computational Diffie-Hellman Problem ("CDHP") and its variations. One example of a CDHP variation is the Inverse Computational Diffie-Hellman Problem ("inv-CDHP") which is to compute $\beta^{-1}W$ for a given $W \in G_1$ and $\beta W$, where $\beta \in Z_q^*$, and where $Z_q^*$ is the multiplicative group of $Z_q$.

Block 510 typically indicates a license server or the like, such as license server S 130 of FIG. 1, generating a public-private key pair for use by the BPBSA. In this example, license server S picks up a random number $x \in Z_q^*$, and computes $P_{pub} = xP$, where P is a generator of group $G_1$. The public key $P_{pub}$ and the secret (such as secret 132 of license server S 130 of FIG. 1) or private key is x. P is generally publicly known. Further, $H_0(.)$ is a hash function mapping values into $G_1$, and $H(.)$ is a hash function mapping values into $Z_q$. This step is generally performed prior to the steps of FIG. 2. Once the public-private key pair is generated, method 500 typically continues at block 520.

Block 520 typically indicates client C generating a random number r where $r \in Z_q^*$. Once the random number r is generated, method 500 typically continues at block 530.

Block 530 typically indicates client C blinding $K_{ID}$ using the random number r generated at block 520 by computing $m_b = H_0(K_{ID}\|g) |r(H(g)P |P_{pub})$, and then sending the values g,
$m_b$, and $PT_g$ to the license server as indicated in step 4 of FIG. 2. Once $K_{ID}$ is blinded and the values are sent, method 500 typically continues at block 540.

Block 540 typically indicates license server S computing $s_b = (H(g) |x)^{-1} m_b$ after performing step 5 described in connection with FIG. 2. The license server S then typically sends a license (including $s_b$ as computed herein block 550) to client C, as indicated in step 7 of FIG. 2. Once complete, then method 500 typically continues at block 550.

Block 550 typically indicates client C calculating decryption key k based on the license received from license server S and after performing step 8 described in connection with FIG. 2. In one example, client C uses its private key to decrypt $\square_c(s_b)$ to obtain $s_b = (H(g) |x)^{-1} m_b$. It then uses the random number r to calculate the digital content decryption key k where:

$$k = s_b - rP$$
$$= \frac{m_b}{H(g)+x} - rP$$
$$= \frac{H_0(K_{ID}\|g) + r(H(g)P + P_{pub})}{H(g)+x} - rP$$
$$= \frac{H_0(K_{ID}\|g)}{H(g)+x} + \frac{r(H(g)P + xP)}{H(g)+x} - rP$$
$$= \frac{H_0(K_{ID}\|g)}{H(g)+x} + rP - rP$$
$$= \frac{H_0(K_{ID}\|g)}{H(g)+x}$$

At this point, decryption key k can be used to access the selected digital content, and method 400 is typically complete.

Figure 6:
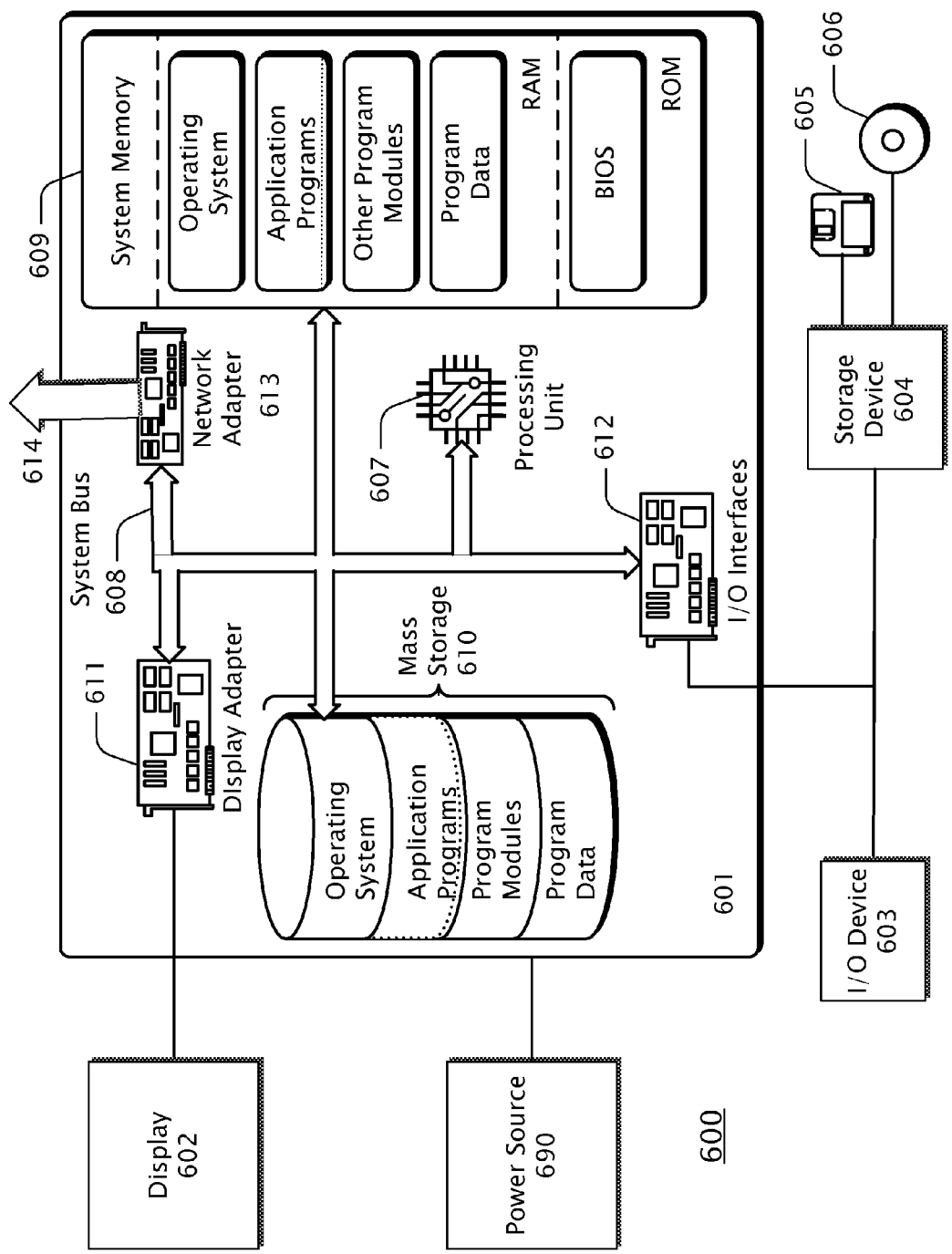
FIG. 6 is a block diagram showing an example computing environment in which the technologies described herein may be implemented.

FIG. 6 is a block diagram showing an example computing environment 600 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 600 typically includes a general-purpose computing system in the form of a computing device 601 coupled to various components, such as peripheral devices 602, 603, 604 and the like. System 600 may couple to various other components, such as input devices 603, including voice recognition, touch pads, buttons, keyboards and/or pointing devices, such as a mouse or trackball, via one or more input/output ("I/O") interfaces 612. The components of computing device 601 may include one or more processors (including central processing units ("CPU"), graphics processing units ("GPU"), microprocessors ("µP"), and the like) 607, system memory 609, and a system bus 608 that typically couples the various components. Processor 607 typically processes or executes various computer-executable instructions to control the operation of computing device 601 and to communicate with other electronic and/or computing devices, systems or environment (not shown) via various communications connections such as a network connection 614 or the like. System bus 608 represents any number of several types of bus structures, including a memory bus or memory controller, a peripheral bus, a serial bus, an accelerated graphics port, a processor or local bus using any of a variety of bus architectures, and the like.

System memory 609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 609 typically stores data, computer-executable instructions and/or program modules comprising computer-executable instructions that are immediately accessible to and/or presently operated on by one or more of the processors 607.

Mass storage devices 604 and 610 may be coupled to computing device 601 or incorporated into computing device 601 via coupling to the system bus. Such mass storage devices 604 and 610 may include non-volatile RAM, a magnetic disk drive which reads from and/or writes to a removable, non-volatile magnetic disk (e.g., a "floppy disk") 605, and/or an optical disk drive that reads from and/or writes to a non-volatile optical disk such as a CD ROM, DVD ROM 606. Alternatively, a mass storage device, such as hard disk 610, may include non-removable storage medium. Other mass storage devices may include memory cards, memory sticks, tape storage devices, and the like.

Any number of computer programs, files, data structures, and the like may be stored in mass storage 610, other storage devices 604, 605, 606 and system memory 609 (typically limited by available space) including, by way of example and not limitation, operating systems, application programs, data files, directory structures, computer-executable instructions, and the like.

Output components or devices, such as display device 602, may be coupled to computing device 601, typically via an interface such as a display adapter 611. Output device 602 may be a liquid crystal display ("LCD"). Other example output devices may include printers, audio outputs, voice outputs, cathode ray tube ("CRT") displays, tactile devices or other sensory output mechanisms, or the like. Output devices may enable computing device 601 to interact with human operators or other machines, systems, computing environments, or the like. A user may interface with computing environment 600 via any number of different I/O devices 603 such as a touch pad, buttons, keyboard, mouse, joystick, game pad, data port, and the like. These and other I/O devices may be coupled to processor 607 via I/O interfaces 612 which may be coupled to system bus 608, and/or may be coupled by other interfaces and bus structures, such as a parallel port, game port, universal serial bus ("USB"), fire wire, infrared ("IR") port, and the like.

Computing device 601 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 601 may be coupled to a network via network adapter 613 or the like, or, alternatively, via a modem, digital subscriber line ("DSL") link, integrated services digital network ("ISDN") link, Internet link, wireless link, or the like.

Communications connection 614, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 690, such as a battery or a power supply, typically provides power for portions or all of computing environment 600. In the case of the computing environment 600 being a mobile device or portable device or the like, power source 690 may be a battery. Alternatively, in the case computing environment 600 is a desktop computer or server or the like, power source 690 may be a power supply designed to connect to an alternating current ("AC") source, such as via a wall outlet.

Some mobile devices may not include many of the components described in connection with FIG. 6. For example, an electronic badge may be comprised of a coil of wire along with a simple processing unit 607 or the like, the coil configured to act as power source 690 when in proximity to a card reader device or the like. Such a coil may also be configure to act as an antenna coupled to the processing unit 607 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 602, I/O device 603, or many of the other components described in connection with FIG. 6. Other mobile devices that may not include many of the components described in connection with FIG. 6, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A Digital Rights Management ("DRM") system operable to protect consumer privacy, the system comprising:
   a client DRM module of a client operable to communicate with a license server;
   a packaged digital content including an encrypted portion and a plain text header, the plain text header including a key identifier uniquely related to a key usable for decrypting the encrypted portion, the key identifier extractable from the packaged digital content by the client DRM module; and
   a processor operable to execute the client DRM module;
   wherein the client DRM module is further operable to:
      blind the key identifier;
      send the blinded key identifier to the license server, wherein the blinded key identifier is signed by the license server;
      receive a license including the signed blinded key identifier from the license server,
      un-blind the signed blinded key identifier resulting in the key, the key being a stable signature, usable to decrypt the encrypted portion, and
   wherein the key identifier is not obtained by the license server from the client DRM module.

2. The system of claim 1 further comprising:
   a group identifier identifying a group to which the packaged digital content belongs, the group including a plurality of packaged digital contents including the packaged digital content, the group identifier extractable from the packaged digital content by the client DRM module;
   wherein the client DRM module is configured to send the group identifier to the license server, and the license server is configured to sign the blinded key identifier using the group identifier.

3. The system of claim 1 further comprising a media player operable to access the packaged digital content using the license.

4. The system of claim 1 further comprising:
   a payment server operable to receive a form of payment from the client DRM module and to return a payment token to the client DRM module, the payment token associated with a group to which the packaged digital content belongs, wherein neither the form of payment nor the payment token indicate the packaged digital content or the key identifier.

5. A method of acquiring a license for a selected digital content including an encrypted portion, the method comprising:
   blinding a key identifier using a random number, the key identifier extracted from the selected digital content, wherein the key identifier cannot be obtained by a license server using the blinded key identifier;
   sending the blinded key identifier to the license server;
   receiving a license including a signed message from the license server, the signed message including the blinded key identifier signed using a stable partially blind signature algorithm; and
   un-blinding, with one or more computers, the signed message using the random number resulting in a key usable to decrypt the encrypted portion of the selected digital content;
   wherein the license server is unable to identify the selected digital content.

6. The method of claim 5 further comprising:
   sending a group identifier to the license server, the group identifier extracted from the selected digital content, the group identifier indicating a group to which the selected digital content belongs, the group including a plurality of digital contents including the selected digital content;
   wherein the signed message including the blinded key identifier was signed using the stable partially blind signature algorithm and using the group identifier.

7. The method of claim 6 further comprising:
   submitting a form of payment including the group identifier;
   receiving a payment token related to the group responsive to the submitting; and
   sending the payment token to the license server.

8. The method of claim 7 wherein the payment token includes a description of acquired rights to the selected digital content.

9. The method of claim 5 wherein the license includes a description of acquired rights to the selected digital content.

10. The method of claim 5 wherein the encrypted portion was previously encrypted using an encryption key formed using the key identifier, and the stable partially blind signature algorithm, and a secret known only to the license server.

11. The method of claim 6 wherein the encrypted portion was previously encrypted using an encryption key formed using the key identifier, and the group identifier, and the stable partially blind signature algorithm, and a secret known only to the license server.

12. The method of claim 5 wherein the signed message is encrypted by the license server using a public key prior to the receiving the license including the signed message.

13. The method of claim 12 wherein, after receiving the license including the signed message, the signed message is decrypted, prior to the un-blinding, using a private key corresponding to the public key.

14. The method of claim 5 wherein the license and the random number are stored in a license store.

15. The method of claim 5 wherein the stable partially blind signature algorithm is a Rivest, Shamir, and Adleman ("RSA") blind signature algorithm.

16. The method of claim 15 wherein the blinding is expressed as $m_b = K_{ID} \cdot R \bmod n$ where $m_b$ is the blinded key identifier $K_{ID}$, and where $R = r^g \bmod n$ where g is the group identifier, and where $1 < r < n-1$ where $n = pq$ where p and q are large prime numbers.

17. The method of claim 5 wherein the stable partially blind signature algorithm is a Bilinear Pairing blind signature algorithm.

18. A computer-readable storage medium including computer-readable instructions embodying a method of acquiring a license for a selected digital content including an encrypted portion, the method comprising:
   blinding a key identifier wherein the key identifier cannot be obtained by a license server using the blinded key identifier;
   sending the blinded key identifier to the license server;
   receiving a license including a signed message from the license server, the signed message including the blinded key identifier signed using a stable partially blind signature algorithm and a secret known only to the license server; and un-blinding the signed message resulting in a key usable to decrypt the encrypted portion of the selected digital content and wherein the key is a stable signature;

wherein the license server is unable to identify the selected digital content.

19. The computer-readable storage medium of claim 18, the method further comprising:

encrypting the signed message using a public key prior to receiving the signed message; and decrypting the signed message using a private key corresponding to the public key prior to un-blinding the signed message.

* * * * *